US011684001B2

(12) United States Patent
Hertzog et al.

(10) Patent No.: US 11,684,001 B2
(45) Date of Patent: Jun. 27, 2023

(54) AGRICULTURAL IMPLEMENT

(71) Applicant: CNH Industrial America LLC, New Holland, PA (US)

(72) Inventors: Daniel Hertzog, Blackstad (SE); Bengt Per-Inge Linderson, Odensvi (SE); Per Dennis Wallin, Västervik (SE); Carl Ola Fredrik Nilsson, Västervik (SE); Robert Svensson, Loftahammar (SE); Rickard Karl Gustav Nåhdin, Gamleby (SE)

(73) Assignee: CNH INDUSTRIAL AMERICA LLC, New Holland, PA (US)

( * ) Notice: Subject to any disclaimer, the term of this patent is extended or adjusted under 35 U.S.C. 154(b) by 115 days.

(21) Appl. No.: 16/844,022

(22) Filed: Apr. 9, 2020

(65) Prior Publication Data
US 2020/0337199 A1   Oct. 29, 2020

(30) Foreign Application Priority Data

Apr. 25, 2019 (EP) .................................. 19171117

(51) Int. Cl.
*A01B 3/34* (2006.01)
*A01B 63/00* (2006.01)
*A01B 63/32* (2006.01)

(52) U.S. Cl.
CPC .............. *A01B 3/34* (2013.01); *A01B 63/004* (2013.01); *A01B 63/008* (2013.01); *A01B 63/32* (2013.01)

(58) Field of Classification Search
CPC ........ A01B 3/34; A01B 63/004; A01B 63/008; A01B 63/32
See application file for complete search history.

(56) References Cited

U.S. PATENT DOCUMENTS

| 3,042,120 | A | * | 7/1962 | Heckathorn et al. | ..... A01B 5/14 172/210 |
| 4,778,013 | A | * | 10/1988 | van der Lely | ........... A01B 3/42 172/225 |
| 7,591,226 | B2 | * | 9/2009 | Dix et al. | ................ A01C 7/087 701/50 |
| 7,743,844 | B2 | | 6/2010 | Kovach et al. | |
| 10,959,364 | B2 | | 3/2021 | Knobloch | |
| 11,266,056 | B2 | | 3/2022 | Nair et al. | |

(Continued)

FOREIGN PATENT DOCUMENTS

DE           3438787 A1    4/1986
EP           0169619 A2    1/1986

(Continued)

OTHER PUBLICATIONS

Extended European Search Report for EP Application No. 19171117.5 dated Oct. 28, 2019 (five pages).

*Primary Examiner* — Tara Mayo
(74) *Attorney, Agent, or Firm* — Rebecca Henkel; Rickard DeMille

(57) ABSTRACT

The present invention relates to a plough implement comprising a main frame supporting a plurality of first ground engaging tools, wherein the plough implement comprises a depth adjustment apparatus for moving a first ground engaging tool of the plurality of first ground engaging tools with respect to the main frame to enable adjustment of a working depth of the first ground engaging tool.

16 Claims, 12 Drawing Sheets

(56) References Cited

U.S. PATENT DOCUMENTS

| | | | |
|---|---|---|---|
| 2015/0053437 A1* | 2/2015 | Kovach et al. | ...... A01B 29/048 172/149 |
| 2015/0264857 A1 | 9/2015 | Achen et al. | |
| 2018/0139891 A1 | 5/2018 | Gerber et al. | |

FOREIGN PATENT DOCUMENTS

| | | | | |
|---|---|---|---|---|
| EP | 0199313 A2 | * | 10/1986 | ........... A01B 63/111 |
| EP | 3050416 A1 | * | 8/2016 | ........... A01B 63/111 |
| FR | 2418611 A1 | * | 9/1979 | ........... A01B 63/111 |
| FR | 2933258 A1 | | 1/2010 | |
| GB | 253566 A | * | 6/1926 | ............. A01B 63/12 |
| WO | 2015/057080 A1 | | 4/2015 | |

* cited by examiner

AGRICULTURAL IMPLEMENT

BACKGROUND OF THE INVENTION

The present disclosure relates to an agricultural plough, particularly, but not exclusively, to a plough implement. Another aspect relates to agricultural machinery comprising the plough implement. Other aspects relate to a method for adjusting the working depth of a plough implement.

In agriculture, farming cycles are followed that can roughly be divided into the different steps of land preparation, seed sowing, fertilizing, irrigation, crop growth, and harvesting. Each of these steps is critical to yield optimal crop results and achieve the desired returns on initial investments. Of the listed steps, land preparation is typically further divided into steps of, as necessary, clearing obstructions (e.g. bushes, stones and rocks) and subsequent tillage.

Tilling crumbles and loosens the soil, improves the soil structure and incorporates crop residues and manure into the soil, thus fertilizing the ground. The improved soil structure allows for increased plant root growth, soil aeration and water penetration/filtration. Overall this results in higher yields, better long-term soil fertility, soil moisture retention, and weed management. Tillage can be separated into primary (relatively deep) and secondary (relatively shallow) tillage. In primary tillage, such as ploughing, the soil is turned over such that nutrients come to the surface. In addition to turning up the soil to bring fresh nutrients to the top and depositing plant residue below where it will break down, this process also aerates the earth—enabling it to hold more moisture. Preparing the land to a greater depth produces a rougher surface finish than secondary tillage. Secondary tillage (e.g. seedbed cultivation) breaks up soil clods into smaller masses which might be desirable for small seeds or plants that have minimal clod-handling ability.

Primary tillage, and particularly ploughing, is widely regarded as one of the most effective ways of preventing crop disease, removing weeds, and controlling mice and other pests. In its simplest form the turnplough, also known as the mouldboard plough, includes a variety of plough bodies, which are blades for penetrating and turning over the soil in arrays of adjacent trenches, known as furrows. Modern ploughs typically include a plurality of plough bodies connected to a plough frame such that they are laterally offset manner from each other when the plough is in use. Each plough body is connected to the plough frame via corresponding beams. The plough frame, in turn, is connected to a towing or pushing vehicle via a hitch arranged at a front or back end of the frame.

Depending on the density of the soil, a working depth of the plough bodies can be adjusted. For instance, the plough bodies working depth may be shallow in harder (dense) soils, whereas a deeper working depth may be applied in softer (less dense) soils. The plough bodies can be rigidly attached to the main frame, such that their distance from the main frame remains constant. Accordingly, the working depth of the ploughs are then adjusted by varying the ground clearance of the main frame. If the main frame is brought closer to the ground surface, the ground clearance is reduced, and the plough bodies penetrate deeper into the soil. Similarly, if the main frame is lifted further off the ground, the ground clearance is increased and the plough bodies are pulled out of the soil, thereby reducing the working depth.

The ground clearance of the main frame may be controlled by one or more depth wheels. The one or more depth wheels may be connected to any part of the main frame such as the rear end of the main frame. An adjustable linkage may be provided between the main frame and the depth wheel to allow for changes in the distance between the depth wheel and the main frame. During ploughing, the depth wheel runs on the ground surface and supports the weight of the plough. If the distance between the depth wheel and the main frame is reduced, then the ground clearance between the main frame and the ground surface reduces accordingly. On the other hand, if the distance between the depth wheel and the main frame is increased, the ground clearance of the main frame increases. As outlined before, changing the main frame's ground clearance results in a variation of the plough body working depth.

Most modern ploughs are of the reversible type, in which the main frame is rotatable by 180 degrees (i.e. reversed) with respect to the headstock. A turning cylinder attached to the headstock may be used to rotate (reverse) the plough. During rotation of the main frame, a first set of plough bodies, which was initially arranged below the main frame (first configuration), is transferred to the top of the main frame. At the same time, a second set of plough bodies, which was initially arranged on top of the main frame, is then transferred to a position below the main frame. The reversible plough is then in its second configuration. The main frame may be repeatedly rotated (reversed) between the first and second configuration, particularly during turning manoeuvres on the headlands. Whenever the plough is reversed, the first and second set of plough bodies swap position.

In reversible ploughs, a device of adjusting the working depth of the plough bodies (i.e. the main frame) is required for both configurations of the reversible plough. There are mainly two types of depth control wheels for reversible ploughs. A first type includes a single pivoting depth wheel, which is used in both configurations of the reversible plough. The single pivoting depth wheel has to be moved from one side of the main frame to the other during reversal. This side transfer of the single depth wheel may be achieved by swinging the latter from one side to the other. The swinging movement needs to be controlled/dampened to avoid excessive impacts as the wheel swings down during reversal of the plough.

A second solution avoids the need for a movement of the depth adjustment wheel from one side to the other. In this second alternative, two separate depth wheels may be fixed to the main frame. A first depth wheel can be arranged on a first side of the main frame and a second depth wheel may be arranged on the second, opposite side of the main frame. Each of the two wheels is then only utilised in one configuration of the plough. This double wheel arrangement does not experience dynamic impacts, because the first and second depth wheels are fixed in place during the reversal procedure. However, it is a problem that this "double-/dual-wheel" solution places restrictions on the maximum diameter of the depth wheels, since larger diameters may cause the wheels to touch, particularly when the working depth of the plough bodies is set to deeper levels. Yet, it is generally desirable to utilise large diameter wheels to reduce rolling resistance and soil compaction.

A common problem to both types of depth wheel arrangement described above is that the ground clearance of the main frame is reduced as the working depth of the plough bodies is increased. This reduction of the ground clearance may cause other parts supported by the main frame, such as skimmers or coulters, to start penetrating into the soil deeper than desired. Moreover, reduced ground clearance of the main frame may reduce manoeuvrability of the plough implement and cause soil to adhere to the main frame, thereby reducing the plough implement's service live.

In view of the above, there is generally a need for improved depth adjustment mechanisms and methods for plough implements.

It is an aim of the present invention to solve or at least ameliorate one or more problems of the prior art.

SUMMARY OF THE INVENTION

Aspects and embodiments of the disclosure provide a plough implement and an agricultural machinery as claimed in the appended claims.

In a first aspect of the present disclosure, there is provided a plough implement comprising a main frame supporting a plurality of first ground engaging tools, wherein the plough implement comprises a depth adjustment apparatus for moving at least a first ground engaging tool of the plurality of first ground engaging tools with respect to the main frame to enable adjustment of the working depth of the first ground engaging tool.

Moving the ground engaging tool with respect to the main frame enables the main frame of the plough implement to remain fixed during adjustment of the working depth. In other words, the ground clearance of the main frame does not have to be altered to increase or decrease the working depth of the first ground engaging tool. Rather, the first ground engaging tool itself is actively moved (e.g. up and down) with respect to the main frame to directly adjust the working depth of the first ground engaging tool. The depth adjustment tool is capable of moving the first ground engaging tool into various positions that relate to different working depths. The depth adjustment tool may be able to actively increase and actively decrease the working depth of the first ground engaging tool, even if the plough implement is stationary. The movement of the first ground engaging tool with respect to the main frame may be implemented in a variety of ways, some of which will be discussed in more detail below. In some embodiments, more than one of the pluralities of ground engaging tools may be moved with respect to the main frame individually or simultaneously as will be described below. Similarly, it may also be useful to only move a single ground engaging tool of the plurality of first ground engaging tools with respect to the main frame. For example, a first plough body of an agricultural plough may be moveable with respect to the main frame to adjust the depth of the first furrow, whereas the remaining plough bodies remain fixed with respect to the main frame.

In one embodiment, the depth adjustments apparatus is capable of moving the first and a second ground engaging tool of the plurality of first ground engaging tools with respect to the main frame such that the movement of the first and second ground engaging tools is synchronised. In other words, the depth adjustment apparatus may be capable of moving more than one grounding engaging tool with respect to the main frame. In this example, a single depth adjustment apparatus may be used to move a first and a second ground engaging tool with respect to the main frame in a synchronised manner. Rather than only moving two ground engaging tools, it may also be possible to use the depth adjustment apparatus to move all of the plurality of the first ground engaging tools with respect to the main frame in a synchronised manner. Alternatively, if the plough implement comprises six ground engaging tools, one embodiment may comprise three depth adjustment apparatus, each being capable of moving pairs of ground engaging tools in a synchronised manner. It follows that, in this example, three synchronised pairs of ground engaging tools are moved by three depth adjustment apparatus. Moving two or more of the ground engaging tools in a synchronised manner has the advantage that a homogeneous working depth is achieved for the plurality of first ground engaging tools, therefore providing a more repeatable ground preparation.

In yet another embodiment, the plough implement comprises at least two depth adjustment apparatus, for moving the first and a second ground engaging tool of the plurality of first ground engaging tools with respect to the main frame, and wherein the two depth adjustment apparatus are capable of moving the first and second ground engaging tools independently of each other. According to this embodiment, each of the two or more ground engaging tools of the plurality of first ground engaging tools isendently moveable with respect to the frame. A first ground engaging tool is moveable by a first depth adjustment apparatus and a second ground engaging tool is moveable by a second depth adjustment apparatus. It follows that the working depth of each individual ground engaging tool may be adjusted independently of the remaining engaging tools of the plough implement. This may be particularly useful in fields with a high number of smaller obstacles, which may be avoided by individually lifting some, but not all, of the plurality of first ground engaging tools out of the ground.

The first ground engaging tool of the plurality of first ground engaging tools may be attached to the main frame in a predetermined orientation with respect to a ground surface, the depth adjustment apparatus being capable of moving the first ground engaging tool with respect to the main frame without changing the predetermined orientation of the first ground engaging tool. In one embodiment, the first ground engaging tool may be oriented parallel to the grounds surface, e.g. horizontal on a flat field. Maintaining the orientation of the ground engaging tool with respect to the ground surface is an important factor in achieving the desired tillage results. In the example of a plough, the shares of the plough bodies are designed to work most effectively in a certain orientation with respect to the ground. Accordingly, the depth adjustment apparatus may be constructed to change the working depth of the first ground engaging tool without changing the orientation of the first ground engaging tool with respect to the ground surface at all. Alternatively, the depth adjustment apparatus may be constructed such that the orientation of the first ground engaging tool can be altered as the working depth is adjusted. In other words, the depth adjustment apparatus may compensate for variations in the ground engaging tool orientation automatically during adjustment of the working depth.

In one embodiment, the depth adjustment apparatus may comprise a parallelogram linkage, particularly a four-link parallelogram linkage, connecting the main frame to the first ground engaging tool. The depth adjustment apparatus of this embodiment enables a pivotal movement of a first ground engaging tool into and out of the soil without changing the orientation of the ground engaging tool in the process. In this embodiment, the first ground engaging tool may be connected to the coupler of the four-link parallelogram linkage.

In other alternative embodiments, the depth adjustment apparatus may comprise any other linkage suitable to move the ground engaging tool(s) with respect to the main frame while maintaining the required stability. In one example, a scissor linkage may connect the main frame to the first ground engaging tool. The scissor linkage may be connected to the main frame such that the first ground engaging tool may be lifted and lowered in a direction that is substantially perpendicular to the main frame.

The depth adjustment apparatus may comprise an actuator. The actuator may be arranged between the main frame and the first ground engaging tool and be configured to initiate movement of the first ground engaging tool with respect to the frame. The actuator may be a hydraulic actuator, such as a hydraulic cylinder. Of course, it is equivalently feasible to utilise any other suitable actuator, such as electric or pneumatic actuators.

In another embodiment, the depth adjustment apparatus comprises two actuators, particularly two hydraulic cylinders, a first actuator for adjusting a working depth of the first ground engaging tool and a second actuator for adjusting an orientation of the first ground engaging tool. The depth adjustment apparatus of this embodiment may be configured to synchronise the movement of the first and second actuators such that the orientation of the first ground engaging tool remains constant as the first ground engaging tool is moved in and out of the soil by the first actuator. In one example, the first actuator may cause a pivoting movement of the first ground engaging tool with respect to the main frame, which, depending on the linkage between the main frame and the first ground engaging tool, may cause a change of orientation of the first ground engaging tool. The second actuator may, therefore, be synchronised with the movement of the first actuator, such that the second actuator compensates for the change in orientation of the first ground engaging tool caused by the pivoting movement.

In yet another embodiment, the plough implement comprises a control unit for controlling the depth adjustment apparatus, wherein the control unit is configured to decrease the working depth of the first ground engaging tool of the plurality of first ground engaging tools if an obstacle collision is encountered and/or predicted. According to this embodiment, the depth adjustment apparatus is used as a so-called stone-trip and may, therefore, replace other stone-trip mechanisms that are typically provided on a plough implement. The control unit may be configured to pull the first ground engaging tool out of the soil if an obstacle, such as a rock or stone is encountered and/or predicted to avoid damage to the first ground engaging tool. This particular embodiment refers to an active control of the depth adjustment apparatus in response to obstacle collisions or the prediction thereof. Alternatively, the depth adjustment apparatus may also be set up as a passive stone-trip, in which case the depth adjustment apparatus works as a dampener if an obstacle is encountered. A control unit is not necessarily required for the passive construction of the depth adjustment apparatus.

The plough implement may comprise an obstacle sensor for identifying obstacles in the soil, the obstacle sensor being arranged in front of the first ground engaging tool in a direction of travel. The obstacle sensor may be advantageous in combination with the active stone-trip functionality of the depth adjustment apparatus. This is because, the obstacle sensor may be used to predict obstacle collisions of one or more of the first ground engaging tools during operation of the plough implement. For example, the obstacle sensor may be able to identify the size and position of the obstacle and feed this information back to a control unit in the form of obstacle data. The control unit may use the obstacle data to identify the ground engaging tool or tools that are predicted to collide with the obstacle(s) identified by the obstacle sensor. The control unit may then activate the actuator to move the corresponding ground engaging tools out of the soil just before a collision occurs. Once the plough implement has passed the obstacle, the control unit may then activate the actuator of the depth adjustment apparatus to lower the respective ground engaging tools back into the ground.

In yet another embodiment, the main frame supports a plurality of second ground engaging tools and is transferable between a first configuration, in which the plurality of first ground engaging tools are in a working position, and a second configuration in which the plurality of second ground engaging tools are in a working position, the plough implement comprising a depth adjustment apparatus for moving a first ground engaging tool of the plurality of second ground engaging tools with respect to the main frame to enable adjustment of a working depth of the first ground engaging tool of the plurality of second ground engaging tools. In other words, the plough implement may have a plurality of first and second ground engaging tools on either side of the main frame. In one example, the plough implement of this embodiment may be a reversible plough with a plurality of first plough bodies on a first side of the main frame and a plurality of second plough bodies on a second side of the main frame. Of course, depending on the current configuration of the main frame, an adjustment of either the plurality of first ground engaging tools or the plurality of second ground engaging tool is necessary. In order to adjust a first ground engaging tool of the plurality of second ground engaging tools (e.g. in the second configuration of the main frame), a depth adjustment apparatus may be provided, similar to the depth adjustment apparatus discussed above. The depth adjustment apparatus for the first ground engaging tool of the plurality of second ground engaging tools may be the same as the depth adjustment apparatus of the first ground engaging tool of the plurality of first ground engaging tools. In other words, a single depth adjustment apparatus may be able to change the working depth of at least one ground engaging tool on either side of the main frame. Alternatively, the ground engaging tools on either side of the main frame may be adjusted by separate depth adjustment apparatus. That is, a first depth adjustment apparatus may be provided for the first ground engaging tool of the plurality of first ground engaging tools and a second depth adjustment apparatus may be provided for the first ground engaging tool of the plurality of the second ground engaging tools. This embodiment enables individual adjustment of the ground engaging tools on either side of the main frame, which may be particularly useful in anticipation of uneven grounds for the next run, after reversing the plough.

The first ground engaging tool of the plurality of first ground engaging tools may be moveable independently of the first ground engaging tool of the second plurality of ground engaging tools.

In another embodiment, the depth adjustment mechanism is capable of moving the first ground engaging tool between a first position, in which a minimum working depth is set, and a second position in which a maximum working depth is set, the plough implement comprising a first stop for locking the first ground engaging tool in its first position and/or wherein the ground engaging implement comprises a second stop for locking the first ground engaging tool in its second position. In other words, the first ground engaging tool may be locked in its maximum and/or minimum working depth positions. This may reduce unintentional vibrations during use of the plough implement. Of course, it is also feasible to lock the first ground engaging tool in any position between its first and second position.

In another embodiment, the at least one ground engaging tool is a plough body. Alternatively, the at least one ground engaging tool may be a skimmer The plough implement may be a reversible plough.

In another aspect of the present disclosure, there is provided an agricultural machinery comprising an agricultural vehicle, such as tractor, and any embodiment of the plough implement described above, wherein the plough implement is connected to the front or rear of the agricultural vehicle.

The agricultural vehicle or tractor may include one or more control devices, such as but not limited to programmable or non-programmable processors. Similarly, the plough implement may include one or more control devices, such as but not limited to programmable or non-programmable processors. Additionally or alternatively, the plough implement may be controlled by one or more control devices of the agricultural vehicle. Similarly, the agricultural vehicle may be controlled by one or more control devices of the plough implement.

The agricultural vehicle and/or the plough implement may be remote controlled, e.g. from a farm office. Accordingly, the agricultural vehicle may include one or more communication interfaces for connection to a remote processor and/or a remote controller. Similarly, the plough implement may include one or more communication interfaces for connection to a remote processor and/or a remote controller.

According to another aspect of the present disclosure, there is provided a method for adjusting the working depth of a plough implement with a main frame and at least one ground engaging tool, the ground engaging tool being movable with respect to the main frame to adjust the working depth of the ground engaging tool. The method comprises steps for:

detecting the presence of an obstacle in a path of the ground engaging tool of the plough implement; and reducing the working depth of the ground engaging tool.

Detection of the obstacle may either be done pro-actively by an obstacle sensor, such as a stone sensor, or re-actively, once the ground engaging tool collides with an obstacle. It follows that adjustment of the working depth may be done pro-actively to avoid a collision and reactively, as a way of damage control.

Within the scope of this application it is expressly intended that the various aspects, embodiments, examples and alternatives set out in the preceding paragraphs, and the claims and/or the following description and drawings, and in particular the individual features thereof, may be taken independently or in any combination. That is, all embodiments and all features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the present disclosure will now be described by way of example only, with reference to the accompanying drawings, in which.

DETAILED DESCRIPTION OF THE DRAWINGS

Figure 1A:
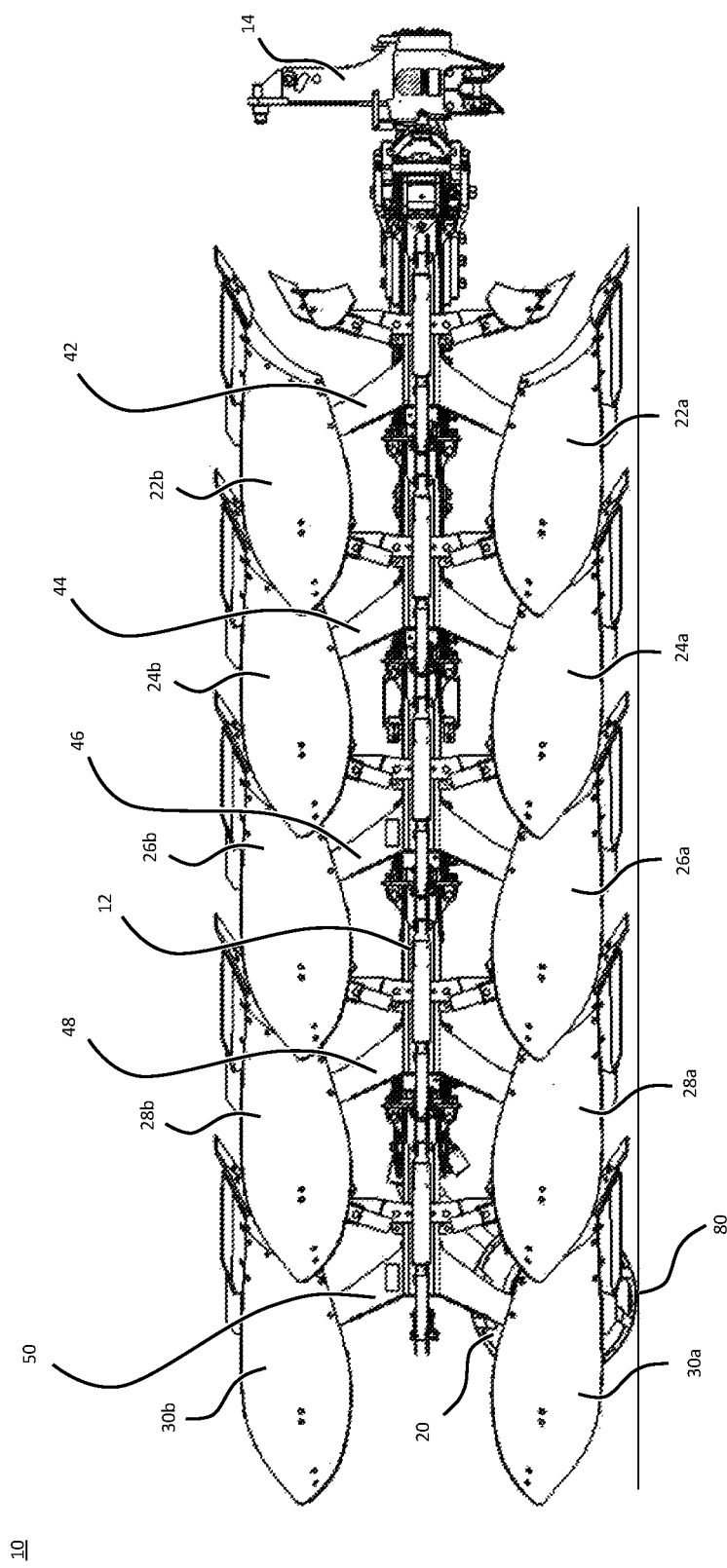
FIG. 1A shows a right-side view of a plough implement with fixed ground engaging tools.
Figure 1B:
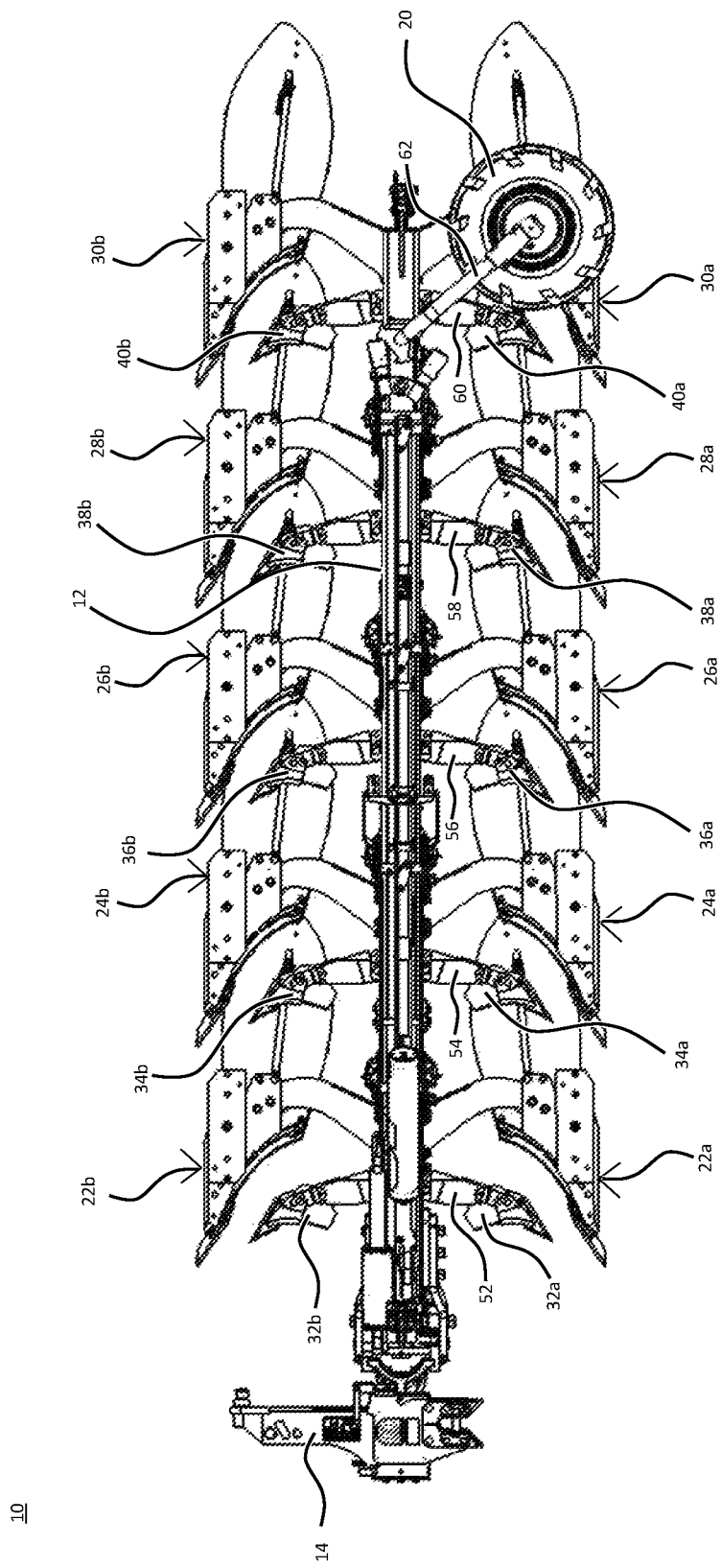
FIG. 1B shows a left-side view of the plough implement shown in FIG. 1A.
Figure 1C:
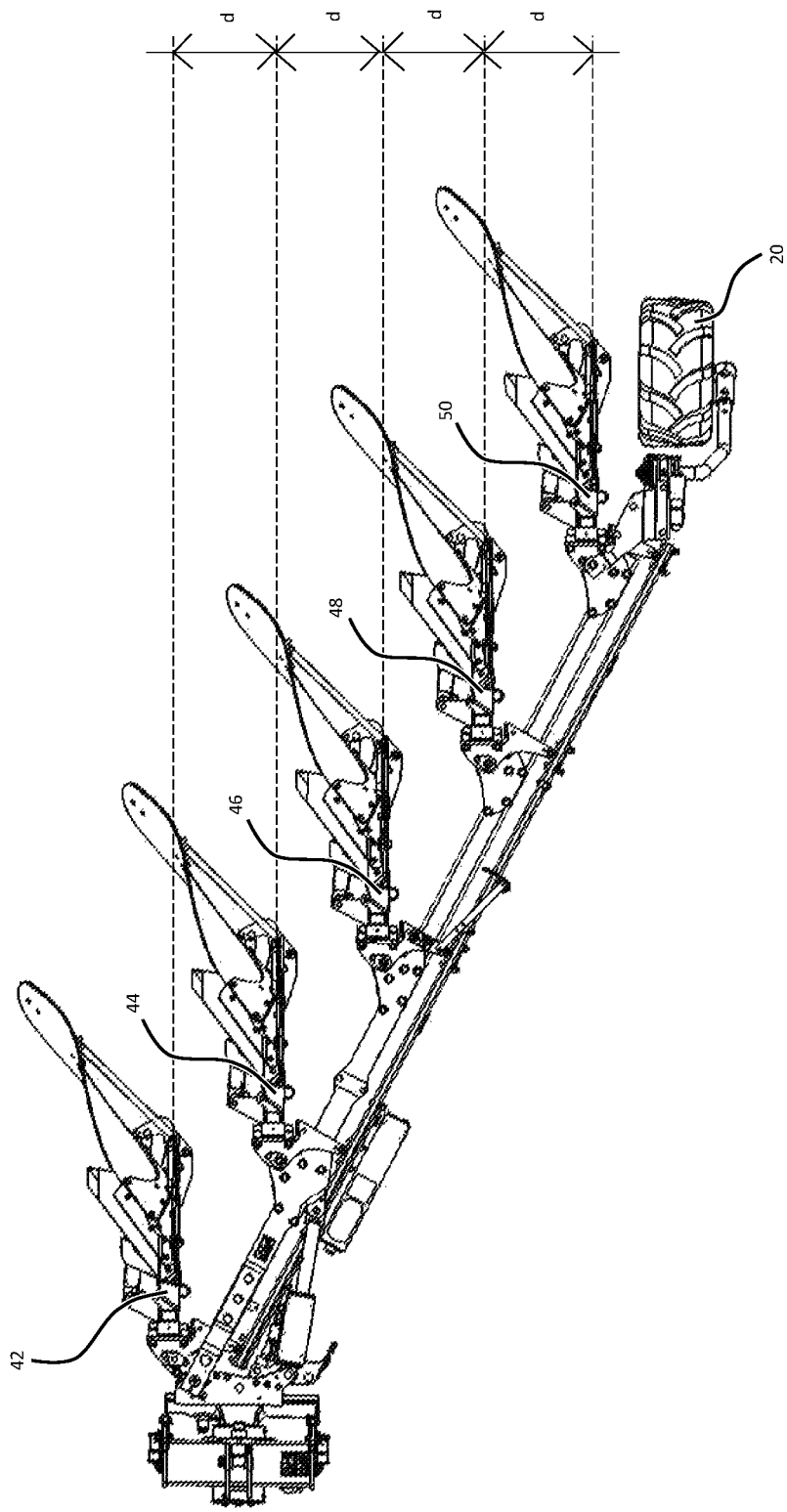
FIG. 1C shows a plan view of the plough implement shown in FIG. 1A.

FIGS. 1A to 1C show various views of a plough implement, particularly a plough 10. As will be described in more detail below, the plough 10 shown in FIGS. 1A to 1C is a reversible plough.

The plough 10 comprises a main frame 12. The main frame 12 may be a rectangular or round tube extending between a headstock 14 at a front end 16 of the plough towards an implement wheel 20 at a rear end 18 of the plough. The main frame 12 supports a variety of ground-engaging tools.

In the example of FIGS. 1A to 1C, the ground engaging tools include plough bodies 22a, 22b, 24a, 24b, 26a, 26b, 28a, 28b, 30a, 30b and plough skimmers 32a, 32b, 34a, 34b, 36a, 36b, 38a, 38b, 40a, 40b. A plurality of first ground engaging tools, i.e. plough bodies 22a, 24a, 26a, 28a, 30a and skimmers 32a, 34a, 36a, 38a, and 40a, are arranged on a first side of the main frame 12. In a first configuration of the main frame 12, illustrated in FIGS. 1A to 1C, the plurality of first ground engaging tools are arranged below the main frame 12.

A plurality of second ground engaging tools, i.e. plough bodies 22b, 24b, 26b, 28b, 30b and skimmers 32b, 34b, 36b, 38b, and 40b, are arranged on a second side of the main frame 12, opposite to the plurality of first ground engaging tools. In the first configuration of the main frame 12, illustrated in FIGS. 1A to 1C, the plurality of second ground engaging tools are arranged above the main frame.

Each of the plough bodies 22a, 22b, 24a, 24b, 26a, 26b, 28a, 28b, 30a, 30b is connected to the main frame 12 by means of beams 42, 44, 46, 48, 50. Each of the beams 42, 44, 46, 48, 50 has a substantially Y-shaped structure.

A first beam 42 supports a first pair of plough bodies 22a, 22b. A second beam 44 supports a second pair of plough bodies 24a, 24b. A third beam 46 supports a third pair of plough bodies 26a, 26b. A fourth beam 48 supports a fourth pair of plough bodies 28a, 28b. A fifth beam 50 supports a fifth pair of plough bodies 30a, 30b.

Each of the pairs of plough bodies 22a, 22b, 24a, 24b, 26a, 26b, 28a, 28b, 30a, 30b is designed to create a furrow in the field when the plough is dragged behind or pushed by an agricultural vehicle such as a tractor. It follows that each run of the illustrated plough 10 through a field creates five adjacent furrows.

Figure 9:
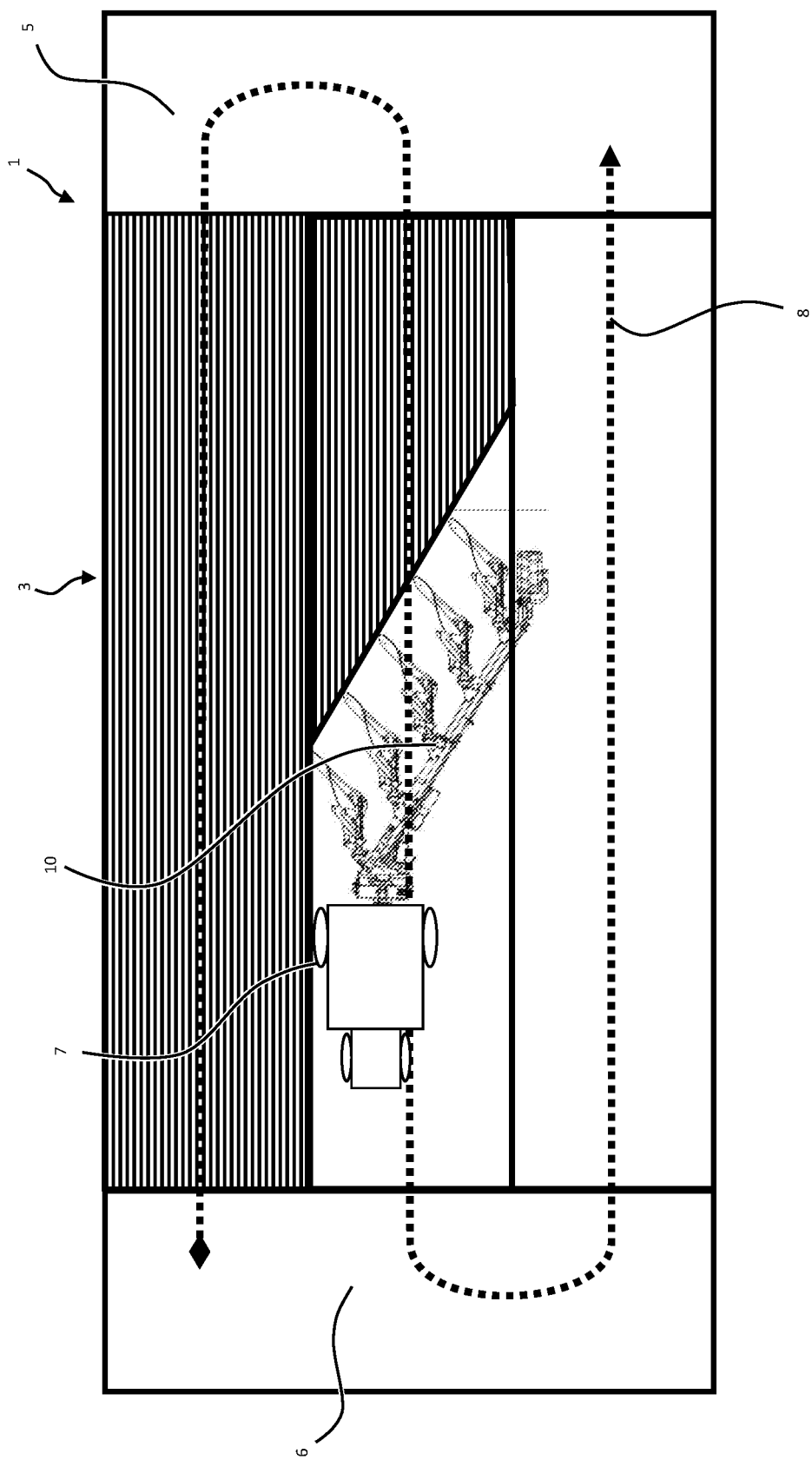
FIG. 9 shows a schematic representation of the trajectory of an agricultural machinery within a work area.

Turning to FIG. 9, a typical operation of an agricultural machinery comprising a tractor 7 and a plough 10 is described. In use, the plough 10 is drawn as an attachment (implement) behind an agricultural towing vehicle (e.g. tractor 7). It will be appreciated that it is equivalently feasible to locate the plough 10 in front of or both in front of and behind the tractor 7.

FIG. 9 shows a schematic work area 1, e.g. a crop field, which is divided into a main field 3 and headlands 5,6. A tractor 7 draws the plough 10 across the main field 3 in generally parallel working rows. The working rows are part of the trajectory 8 of the tractor 7 and typically run in parallel with a long edge of the work area 1. Each working row represents an individual run of the agricultural machinery across the field between headlands 5 and 6. As will be described in more detail below, a five-furrow plough, such as the exemplary plough shown in FIGS. 1A to 1C creates a total of five furrows per run.

At the end of each run/working row, the tractor 7 and plough 10 use the upcoming headland 5 or 6 for turning around, as indicated by trajectory 8. It is known in the art that the soil of the headlands 5, 6 is subject to greater levels of soil compaction as it receives more traffic per unit area than the main field 3. In order not to disturb the soil of the headlands 5, 6 more than necessary, it is known to lift the ground engaging tools, such as the plough bodies and the skimmers, off the ground into a headland or transfer position, just before the plough 10 reaches the headlands 5 or 6 respectively. Once the tractor 7 and the corresponding plough 10 have turned on the headland 5, 6, the ground engaging tools of the plough 10 are, again, lowered towards an operating position to engage the soil of the main field 3.

In the illustration of FIG. 9, the plough 10 is working on the main field 3 and, therefore, is arranged in the operating position. As the plough 10 reaches the border between the headland 5/6 and the main field 3, the plough 10 is transferred to a headland/transfer position. It follows that each working row starts with an adjustment of the plough from the transfer position into the operating position and ends with an adjustment of the plough from the operating position into the transfer position.

The plough 10 shown in FIGS. 1A to 1C is of the fully-mounted type. In fully-mounted ploughs, the weight of the plough is carried exclusively by the tractor when the plough is in its transfer position (on the headlands). In other words, the plough is then exclusively supported by the tractor 7 via headstock 14 and may be lifted off the ground with a lift cylinder of a tractor linkage.

During the turning movement on the headlands, the plough 10 is also reversed. That is, the main frame 12 is rotated by 180 degrees with respect to the headstock 14 to move the plough from a first configuration to a second configuration. In its first configuration shown in FIGS. 1A to 1C, the plough 10 is set up such that the plurality of first ground engaging tools, i.e. plough bodies 22a, 24a, 26a, 28a, and 30a and skimmers 32a, 34a, 36a, 38a, 40a, of each of the pairs are in contact with the soil. This first configuration is shown in FIG. 9 and sometimes also referred to as the "left side configuration", since most of the plough bodies are arranged to the left of tractor 7. In its second configuration (not illustrated), the plough 10 is set up such that the plurality of second ground engaging tools, i.e. plough bodies 22b, 24b, 26b, 28b, 30b and skimmers 32b, 34b, 36b, 38b, 40b, are in contact with the soil. This second configuration is achieved after rotating the main frame by 180 degrees, such that the majority of plough bodies are then located to the right of the tractor (not shown). The second configuration is, therefore, also sometimes referred to as the "right side configuration".

Figure 10:
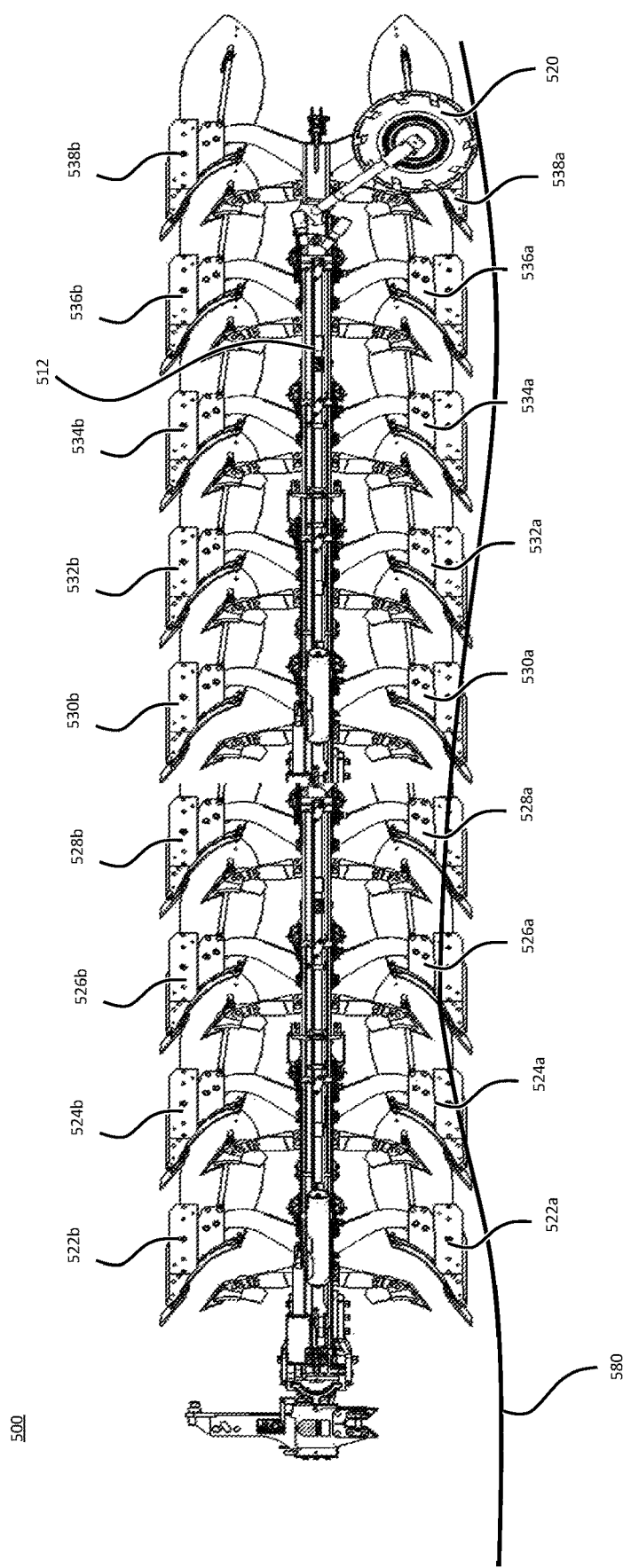
FIG. 10 shows a plough implement moving on an uneven ground surface.

Tilling the field with the plough 10 in this first configuration provides a first furrow created by the first plough body 22a, a second furrow created by the second plough body 24a, a third furrow created by the third plough body 26a, a fourth furrow created by the fourth plough body 28a, and a fifth furrow created by the fifth plough body 30a. A furrow width is determined by the lateral distance d between the plough bodies 22a, 22b, 24a, 24b, 26a, 26b, 28a, 28b, 30a, 30b, as illustrated in FIG. 10.

As the reversible plough 10 reaches the end of the first run, the main frame 12 is rotated by 180 degrees (reversed) with respect to the headstock 14. A turning cylinder (not shown), attached to the headstock 14 may be used to rotate (reverse) the plough 10. During rotation of the main frame, the first plurality of plough bodies, e.g. 22a, 24a, 26a, 28a, 30a, are transferred to the top of the plough 10. At the same time, the second plurality of plough bodies e.g. 22b, 24b, 26b, 28b, 30b, which were not in use in the previous run, is then transferred to the lower end of the plough 10 and will be submerged in the soil during the next run. The reversible plough is then in its second configuration (not shown).

Executing a second run of the field with the plough 10 in this second configuration provides a first furrow created by the sixth plough body 22b, a second furrow created by the seventh plough body 24b, a third furrow created by the eighth plough body 26b, a fourth furrow created by the ninth plough body 28b, and a fifth furrow created by the tenth plough body 30b.

Reversing the plough 10 between consecutive runs has the advantage that the plough bodies 22a, 22b, 24a, 24b, 26a, 26b, 28a, 28b, 30a, 30b that engage the soil always face the same side edge of the main field 3, irrespective of the tractor's orientation.

In both configurations of the plough 10 the main frame 12 is supported by an implement wheel 20. The implement wheel 20 is arranged at the back end 18 of the plough 10. Since the plough bodies 22a, 22b, 24a, 24b, 26a, 26b, 28a, 28b, 30a, 30b and the skimmers 32a, 32b, 34a, 34b, 36a, 36b, 38a, 38b, 40a, 40b are generally fixed to the main frame via beams 42, 44 46, 48 and 50, there is no possibility of adjusting the working depth of said ground engaging tools without changing the ground clearance of the main frame 12. To this end, the plough 10 shown in FIGS. 1A to 1C includes implement wheel 20, which acts as a depth wheel to adjust the ground clearance of the main frame 12. A linkage provided between the implement wheel 20 and the main frame 12 allows the operator to lift or lower the main frame 12 with respect to a ground surface 80. Since the position of the plurality of first and second ground engaging tools is fixed with respect to the main frame 12, any change in the main frame's ground clearance will also affect the working depth of the plurality first and second ground engaging tools. In particular, if the main frame 12 is lowered by adjusting the link between implement wheel 20 and the main frame 12, then the working depth of the plurality of first ground engaging tools shown in FIGS. 1A to 1C is increased, i.e. the plurality of first ground engaging tools are lowered further into the soil. If, on the other hand, the main frame 12 is lifted, then the working depth of the plurality of first ground engaging tools is decreased, i.e. the plurality of first ground engagement tools are pulled out of the soil.

Figure 2:
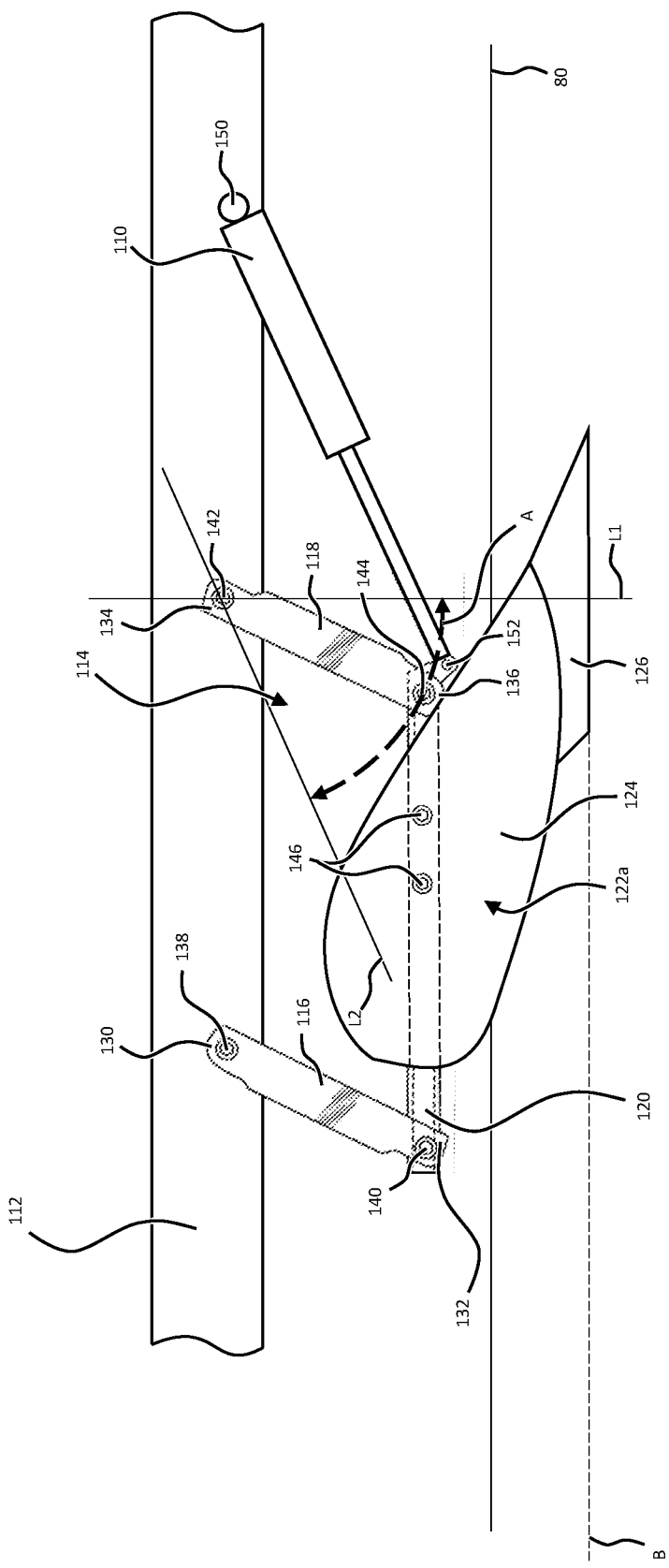
FIG. 2 shows a schematic representation of a ground engaging tool connected to the main frame of a plough implement via a four-bar-linkage.

Turning to FIG. 2, there is shown an alternative way of changing the working depth of the ground engaging tools, according to an embodiment of the present disclosure. FIG. 2 is a schematic representation of the connection between a main frame 112 and a first ground engaging tool 122a. It should be understood that the plough implement of the present disclosure may have a plurality of first ground engaging tools and a plurality of second ground engaging tools similar to plough 10 shown in FIGS. 1A to 1C. FIG. 2 only shows the connection between the main frame 112 and one of the plurality of first ground engaging tools. The first ground engaging tool 122a is a plough body comprising a mould board 124 and a share 126. The first ground engaging tool 122a is connected to the main frame 112 via a four-bar-linkage 114. The four-bar-linkage 114 is a parallelogram linkage. The four-bar-linkage 114 includes a base, which is represented by the main frame 112, a first pivotable link 116, a second pivotable link 118, and a coupler link 120. The first pivotable link 116 is pivotably connected to the main frame 112 at a first end 130 and pivotably connected to the coupler link 120 at an opposite, second end 132. The second pivotable link is connected to the main frame at a first end 134 and connected to the coupler link 120 at an opposite, second end 136.

The first pivotable link 116 is connected to the main frame 112 at its first end 130 via pivot 138. At its opposite, second end 132 the first pivotable link 116 is connected to the coupler link 120 via pivot 140. The second pivotable link 118 is connected to the main frame at its first end 134 via pivot 142. At its opposite, second end 136, the second pivotable link 118 is connected to the coupler link 120 via pivot 144.

The pivotable links 116 and 118 are identical in length, i.e. the distance between pivots 138 and 140 of the first pivotable link 116 is identical to the distance between pivots 142 and 140 of the second pivotable link 118.

The distance between the first pivot 138 of the first pivotable link 116 and the first pivot 142 of the second pivotable link 118 is identical to the distance between the second pivot 140 of the first pivotable link 116 and the second pivot 144 of the second pivotable link 118. The first and second pivotable links 116, 118 are arranged in parallel to each other. The coupler link 120 and the base (represented by part of the main frame 112 between pivots 138 and 142) are arranged in parallel.

The first ground engaging tool 122a (plough body) is connected to the coupler link 120. In this example, the first ground engaging tool 122a may be removably connected to the coupler link 120 via fastening members 146. Of course, any other fastening method may also be feasible to connect the first ground engaging tool 122a to the coupler link 120.

It will be understood that whenever the four-bar-linkage 114 is moved, the first and second pivotable links 116, 118 remain parallel. Similarly, the coupler link 120 will always remain parallel to the base bar, i.e. to the main frame 112, during movement. A range of movement is schematically shown in FIG. 2 with arrow A. Arrow A shows the possible trajectory of the second pivot 144 during movement of the four-bar-linkage 114. Of course, the second pivot 140 of the first pivotable link 116 has a corresponding range of movement. The pivot 144 may move between a first end position indicated by line L1 and a second end position indicated by line L2. As pivot 144 moves between its first end position and second end position along arrow A, so does pivot 140 of the first pivotable link 116. Consequently, the coupler link 120 will undergo the same motion. It follows that in the first end position of the second pivotable link 118, indicated by line L1, the coupler link 120 is at its lowest point, i.e. at a maximum distance from main frame 112. In the second end position of the second pivotable link 118, indicated by line L2, the coupler link 120 is at its top end, i.e. closest to main frame 112. Accordingly, the working depth of the ground engaging tool 122a, which is connected to coupler link 120, changes as the first and second pivotable links 116, 118 pivot about their respective first pivots 138, 142. Accordingly, the first ground engaging tool 122a also moves between a first position, in which a maximum working depth is set, i.e. when the second pivotable link 118 is aligned with line L1, and a second position, in which a minimum working depth is set, i.e. when the second pivotable link 118 is aligned with line L2. It follows that the working depth of the first ground engaging tool 122a shown in the embodiment of FIG. 2 is individually adjustable, irrespective of the ground clearance of the main frame 112. Accordingly, there may be no need for an adjustable implement wheel (depth wheel) with the plough implement of the present disclosure. Rather, the distance between the implement wheel and the main frame may be fixed, such that the ground clearance of the main frame 112 remains stable.

Of course, other ground engaging tools may be connected to the main frame in the same or similar ways as the first ground engaging tool 122a. It follows that the working depth of other ground engaging tools, such as the remaining plough bodies, may also be adjusted individually, irrespective of the ground clearance of the main frame 112. Moreover, each of the ground engaging tools may be adjustable independently of each other. For example, each of the plurality of first ground engaging tools (i.e. ground engaging tools on the first side of the of the main frame 112) may be independently adjustable to have individual distances from the main frame that may be different to a main frame distance of an adjacent ground engaging tool. This arrangement is particularly useful in uneven field conditions. On uneven ground surface 580 is schematically represented in FIG. 10, for example. FIG. 10 shows a plough implement 500 with fixed plough bodies 522a, 524a, 526a, 528a, 530a, 532a, 534a, 536a, 538a, 522b, 524b, 526b, 528b, 530b, 532b, 534b, 536b, 538b, which are not moveable with respect to the frame, similar to the plough implement 10 of FIGS. 1A to 1C. An implement wheel 520 runs on an uneven ground surface 580 and defines the ground clearance of a main frame 512.

It will be appreciated that, as the plough implement 500 is moved across the field with uneven ground surface 580, some of the plough bodies, such as plough bodies 524a, 526a, 528a, 530a, and 532a at least partially penetrate the soil, whereas other plough bodies, such as plough bodies 522a, 534a, 536a, and 538a are elevated above the soil and thus do not penetrate into the soil, causing an uneven plough depth, and in this case discontinuous furrows. Independently adjustable ground engaging tools, such as the one described in FIG. 2, will allow for the working depth to be adjusted to the ground conditions to achieve homogenous furrows. The ground conditions may be detected with a sensor on the implement and/or on the agricultural (towing) vehicle.

In an alternative embodiment, some of the ground engaging tools may be fixed with respect to the main frame 112, similar to the solution shown in FIGS. 1A to 1C, whereas other ground engaging tools may be moveable with respect to the main frame, for example with a four-bar-linkage, such as the one shown in FIG. 2.

Turning back to FIG. 2, an actuator 110 is provided to move the four-bar-linkage between the first and second end positions. The actuator 110 and the four-bar-linkage 114 are part of a depth adjustment apparatus that is used to move the first ground engaging tool 122*a* with respect to the main frame 112. The actuator 110 according to the embodiment of FIG. 2 is a hydraulic cylinder. The chambers of the hydraulic cylinder may be connected to an existing hydraulic system of a corresponding towing vehicle (not shown), which will supply pressurised hydraulic fluid to cause movement of the four-bar-linkage 114. A first end 150 of the actuator 110 is connected to the main frame 112. A second end 152 of the actuator 110 is connected to the coupler link 120 of the four-bar-linkage 114. Accordingly, in the embodiment of FIG. 2, the second pivotable link 118 will be moved towards its first end position indicated by line L1 when the hydraulic cylinder is retracted. Similarly, the second pivotable link 118 will be moved in the opposite direction, towards its second end position indicated by line L2, when the hydraulic cylinder is extended. Mechanical end stops may be provided to limit movement of the four-bar-linkage 114 and potentially lock four-bar-linkage 114 into its first and/or second end position. Of course, the plough can also be used to work a field when the four-bar linkage 114 is in an intermediate position, between the first end position and the second end position. A latch may be provided to lock the four bar linkage into any desired, intermediate position between the first and second end positions.

In view of the above, an extension of the actuator 110 in FIG. 2 will cause the ground engaging tool 128 to be pushed out of the ground, i.e. a decrease in working depth. Similarly, a retraction of actuator 110 will cause the first ground engaging tool 122*a* to be pulled further into the soil, thereby increasing the working depth.

FIG. 2 further shows an orientation of the first ground engaging tool 122*a* during ploughing. In the example of FIG. 2, the first ground engaging tool 122*a* is a plough body with a share 126, which is oriented in a horizontal direction indicated by axis B. Due to the layout of the four-bar-linkage 114, this horizontal orientation will not change as the working depth of the first ground engaging tool 122*a* is adjusted. In other words, the depth adjustment apparatus of FIG. 2 will act to maintain the orientation of the first ground engaging tool 122*a*, since coupling link 120 will maintain its orientation with respect to the main frame 112.

Figure 3:
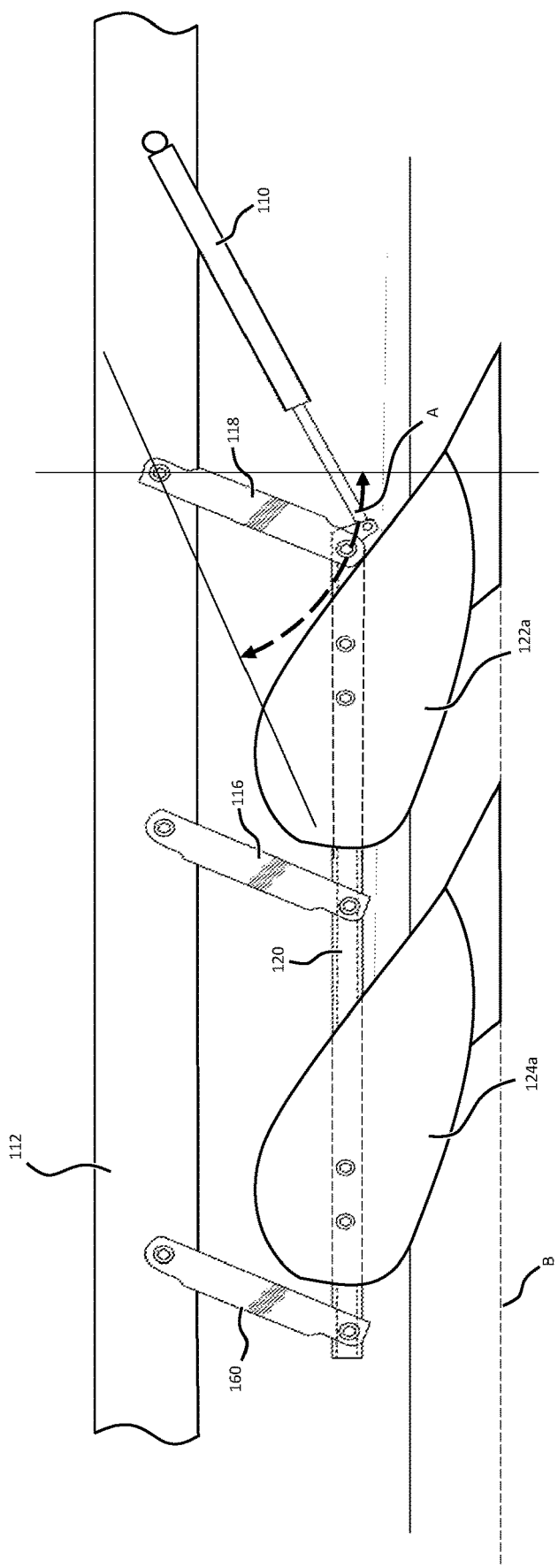
FIG. 3 shows a schematic representation of two ground engaging tools connected to a main frame of a plough implement in a synchronised fashion.

Another embodiment is schematically represented in FIG. 3. Parts of the embodiment in FIG. 3 that have an identical functionality to parts of the embodiment shown in FIG. 2 are labelled with identical reference signs. In the embodiment of FIG. 3, two ground engaging tools, a first ground engaging tool 122*a* and a second ground engaging tool 124*a* of the plurality of first ground engaging tools are connected to the same coupler link 120. The four-bar-linkage 114 of FIG. 2 has been replaced by a five-bar-linkage, which is arranged as two parallelogram linkages. A first parallelogram linkage is formed by the first pivotable link 116, the second pivotable link 118, the coupler link 120 and the main frame 112. A second parallelogram linkage is formed by a third pivotable link 160, the first pivotable link 116, the coupling link 120 and the main frame 112. Both the first and second ground engaging tools 122*a*, 124*a* move together with coupling link 120 in a similar fashion to coupling link 120 of FIG. 2. Accordingly, the depth adjustment of the first and second ground engaging tools 122*a*, 124*a* is synchronised via coupling link 120. Of course, any number of ground engaging tools may be connected to the coupling member 120 such that the working depth of several or all ground engaging tools (on the same side of the main frame 112) may be adjusted at the same time. Actuation may then be achieved by a single actuator 110.

Figure 4:
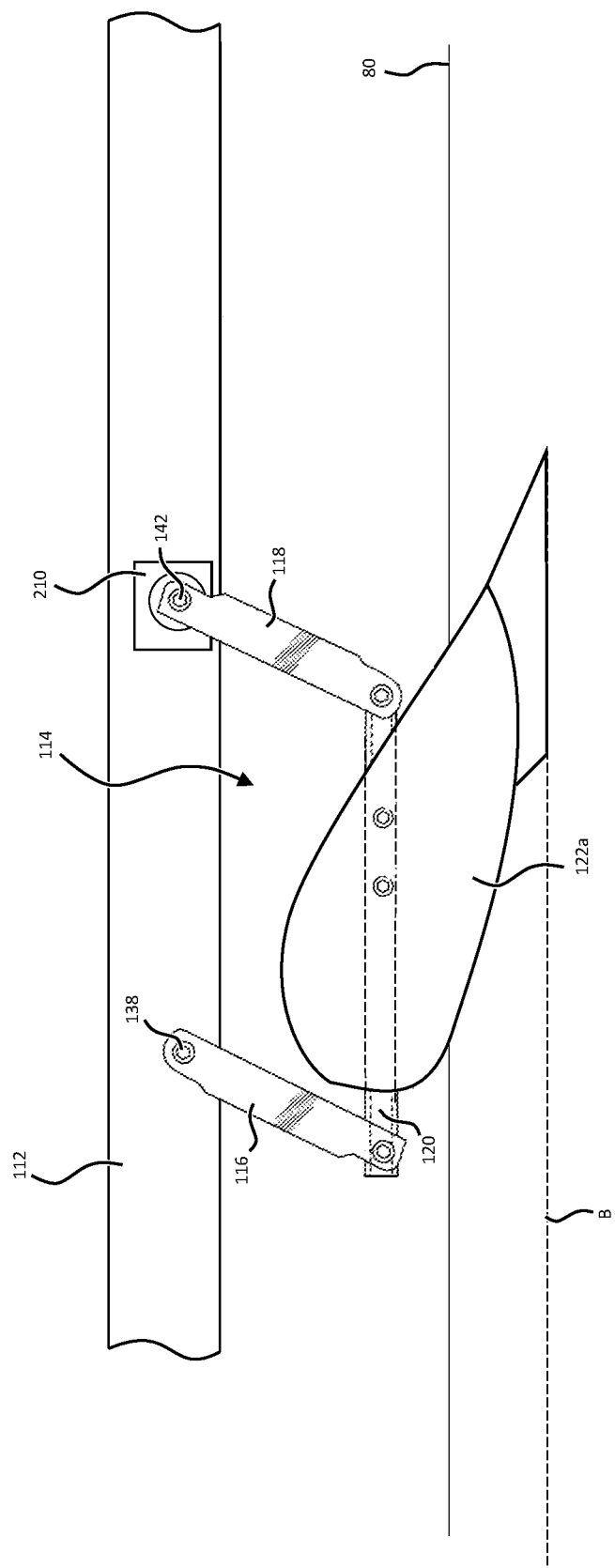
FIG. 4 shows a schematic representation of a ground engaging tool connected to a main frame of a plough implement via four-bar-linkage.

FIG. 4 shows another embodiment of the present disclosure, in which, compared to the embodiment of FIG. 2, the actuator 110, which is constructed as a hydraulic cylinder, has been replaced by an actuator 210 that is an electric motor. Actuator 210 is an electric motor which is connected between the main frame 112 and the first pivot 142 of the second pivotable link 118 of the four-bar-linkage 114. Of course, the actuator 210 (or an additional actuator) may also be connected to the first pivot 138 of the first pivotable link 116. The actuator 210 may be used to pivot the four-bar-linkage 114 between its first and second end positions, or any position in between, to adjust the working depth of the first ground engaging tool 122*a*. The four-bar-linkage 114 and the actuator 210 (electric motor) are part of a depth adjustment apparatus for moving the first ground engaging tool 122*a* with respect to main frame 112.

Figure 5:
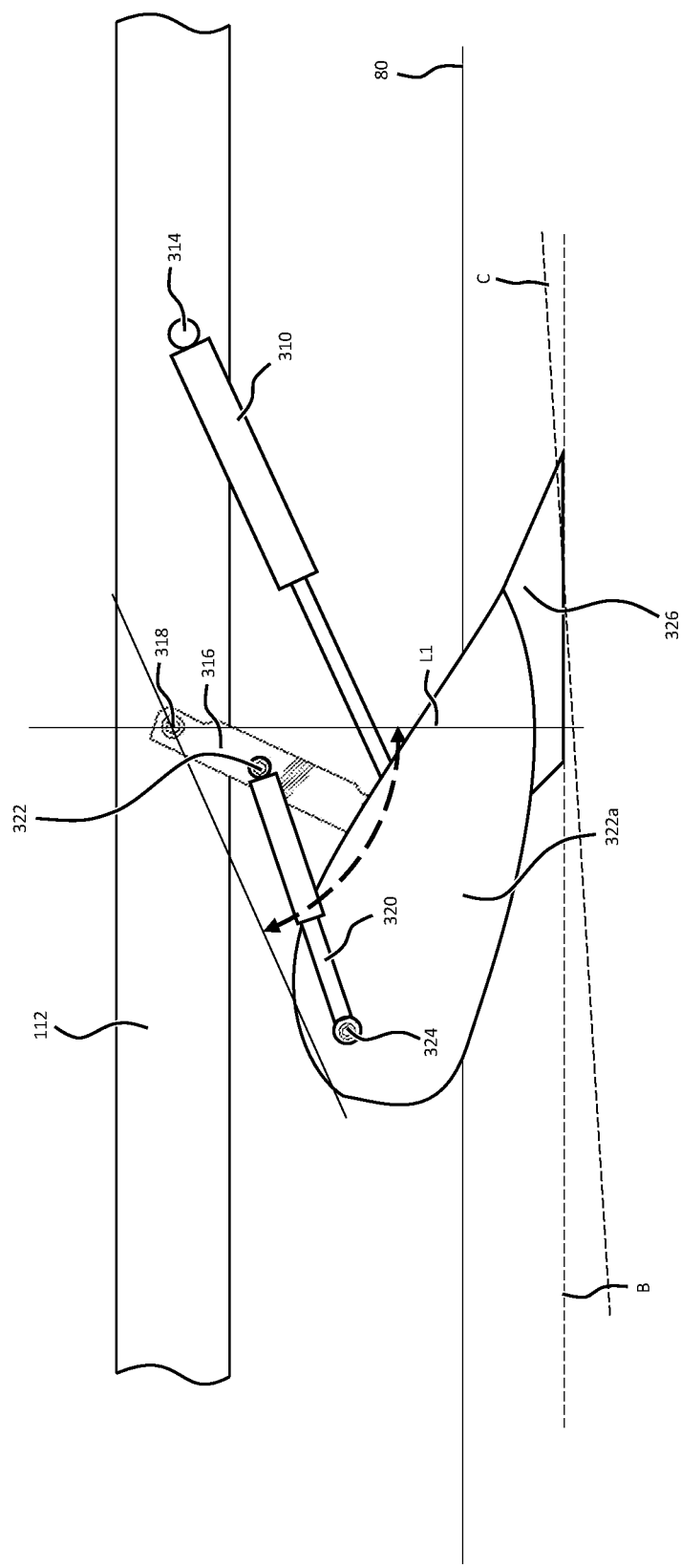
FIG. 5 shows a schematic representation of a ground engaging tool connected to a main frame of a plough implement with two separate actuators.

Turning to FIG. 5, there is shown another depth adjustment apparatus according to another embodiment of the plough implement. The depth adjustment apparatus of FIG. 5 includes a first actuator 310 and a second actuator 320. A first ground engaging tool 322*a* is connected to the main frame 112 via a pivotable link 316. The pivotable link has a first pivot 318 connecting the pivotable link 316 to the main frame 112. At an opposite, second end the pivotable link 316 comprises a second pivot (not shown) connecting the pivotable link 316 to the first ground engaging tool 322*a*. Accordingly, the ground engaging tool 322*a* may pivot together with pivotable link 316 about main frame 112 to adjust the working depth of the first ground engaging tool 322*a*.

In order to move the pivotable link 316, a first actuator 310 is provided. The first actuator 310 has a first pivot 314 connected to the main frame 112 and a second pivot (not shown) connected to the pivotable link 316. The first actuator 310 is a hydraulic cylinder. The hydraulic cylinder may pivot the pivotable link 316 and the first ground engaging tool 322*a* between first and second positions explained with respect to FIG. 2.

A second actuator 320 is provided between the pivotable link 316 and the first ground engaging tool 322*a*. The second actuator 320 is a hydraulic cylinder. A first end 322 of the second actuator 320 is pivotably connected to the pivotable link 316. An opposite, second end 324 is pivotably connected to the first ground engaging tool 322*a* via a pivot. The depth adjustment apparatus of FIG. 5 comprises the first actuator 310, the second actuator 320 and pivotable link 316.

The second actuator 320 may be used to maintain the orientation of the first ground engaging tool 322*a* during depth adjustment. It will be appreciated that, if the pivotable link 316 and the first ground engaging tool 322*a* are pivoted together by means of actuator 310, the orientation of the first ground engaging tool 322*a* may change during the pivoting movement. To compensate for such a change of orientation, the second actuator 320 may be extended or retracted. This will compensate by realigning the first ground engaging tool with the desired orientation, such as the horizontal direction indicated by line B in FIG. 5.

For example, if the first actuator 310 is retracted to pivot the pivotable link 316 towards line L1, the working depth is increased and the orientation of the share 326 of the first ground engaging tool 322*a* will change orientation (e.g. the lift up), as indicated by line C. To counteract this change of orientation of the first ground engaging tool 322*a*, the second actuator 320 may be retracted. Retraction of the second actuator 320 will cause the share 326 of the first ground engaging tool 322*a* to be lowered to maintain its horizontal orientation per line B.

The first and second actuators 310, 320 may be connected to a control unit (not shown), which may automatically synchronise actuation of both actuators 310, 320 in order to keep the first ground engaging tool 322a (here a plough body) in its desired orientation, when the working depth is adjusted.

Figure 6:
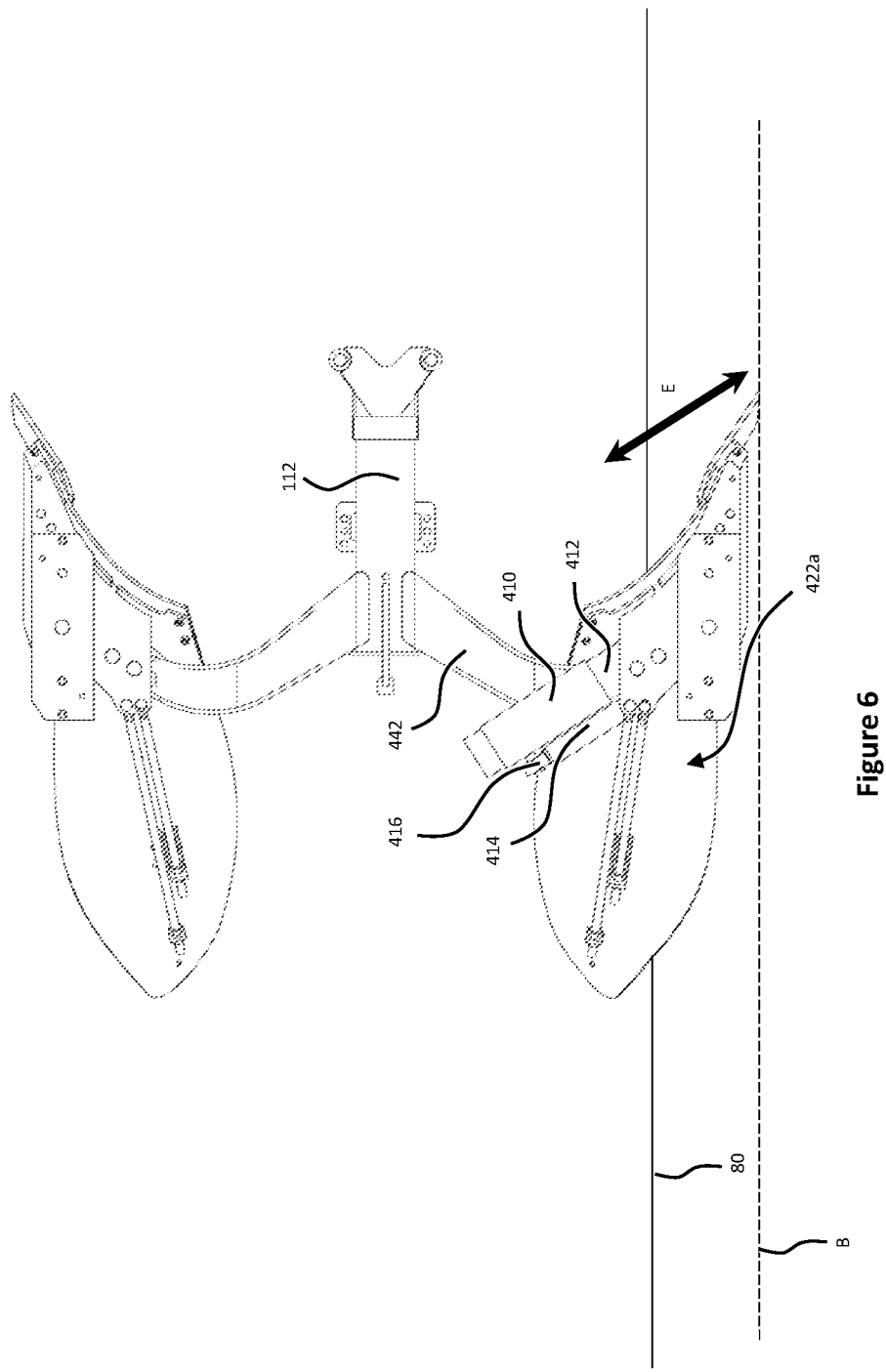
FIG. 6 shows a schematic representation of a ground engaging tool connected to a main frame of a plough implement with a sliding mechanism.

With reference to FIG. 6, there is shown a depth adjustment apparatus according to another embodiment of the present disclosure. The depth adjustment apparatus of FIG. 6 is configured to move a ground engaging tool 422a, e.g. a plough body, in a translational direction along arrow E. In other words, rather than pivoting about the main frame, as described with reference to FIGS. 2 to 5, the ground engaging tool 422a of FIG. 6 may be moved in a translational fashion at an angle with respect to the main frame 112 to adjust the working depth of the ground engaging tool 422a.

The depth adjustment apparatus comprises a guide bush 410 and a sliding member 412. The guide bush 410 is fixed to the main frame 112. In this particular embodiment, the guide bush 410 is attached to one of the legs of a Y-shaped beam 442, which is in turn attached to the main frame 112. It should be understood, however, that the guide bush 410 could also be directly attached to the main frame 112 without the need for a separate beam 442.

The sliding member 412 is received within the guide bush 410. The sliding member 412 is movable with respect to the guide bush 410 along arrow E. One end of the sliding member 412 is attached to the ground engaging tool 422a. An opposite end of the sliding member is movable within the guide bush 410. Accordingly, if sliding member 412 moves along arrow E, so does the ground engaging tool 422a, resulting in a depth adjustment. It will be appreciated that, during the depth adjustment, the ground engaging tool 422a maintains its orientation parallel to line B.

The depth adjustment apparatus further comprises an actuator 414, particularly a hydraulic cylinder. The actuator 414 has a first end 416 connected to the guide bush 410 and an opposite, second end (not shown) connected to the ground engaging tool 422a. Accordingly, extending the actuator 414 will increase the working depth of the ground engaging tool 422a. Similarly, retracting the actuator 414 will reduce the working depth of the ground engaging tool.

Figure 7:
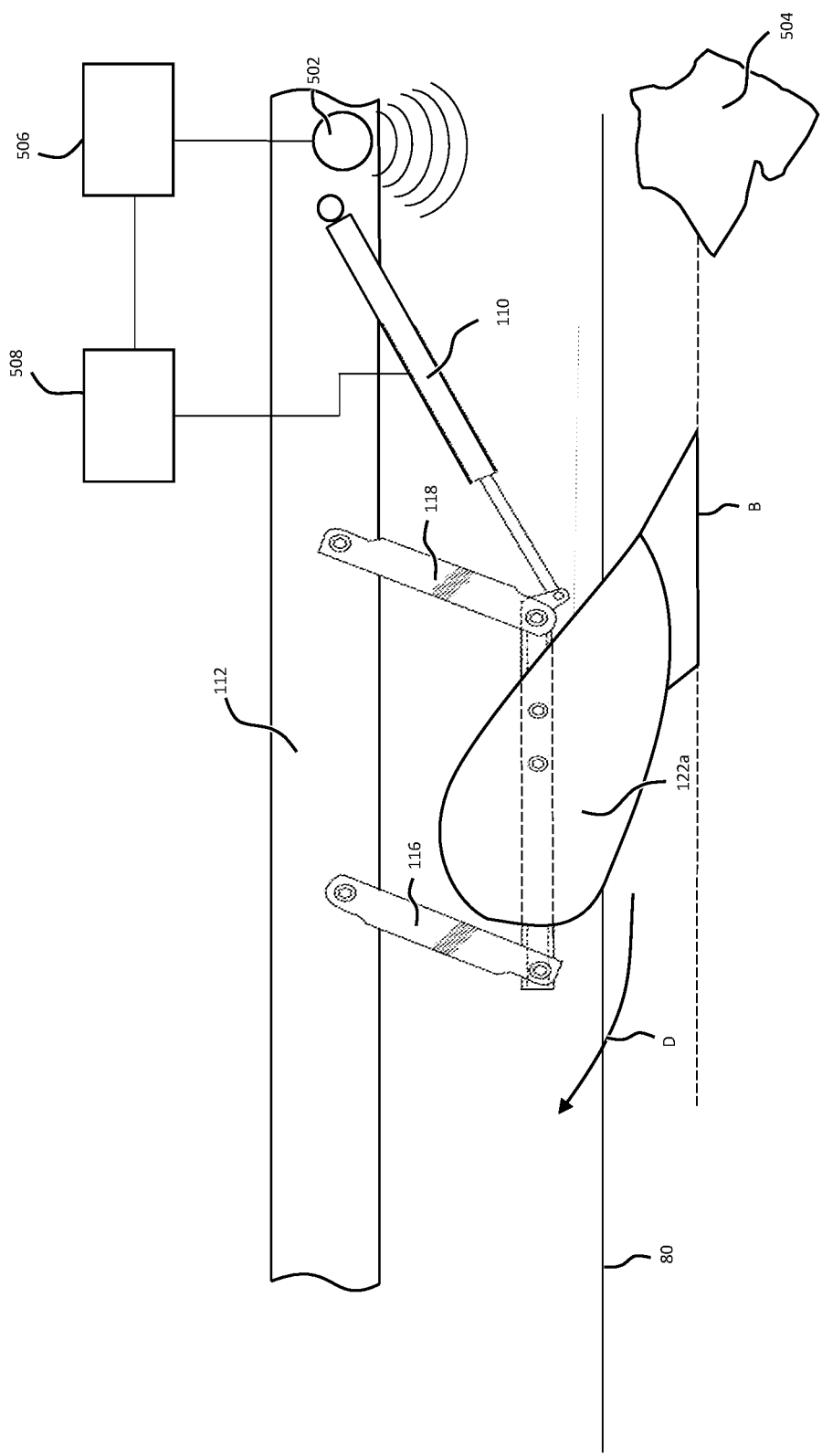
FIG. 7 shows a schematic representation of parts of a plough implement comprising an obstacle sensor.

FIG. 7 shows an embodiment of the present disclosure, in which the plough implement comprises an obstacle sensor 502. The depth adjustment apparatus of FIG. 7 is substantially identical to the depth adjustment apparatus described with respect to FIG. 2. Accordingly, corresponding parts have been labelled with identical reference signs. The obstacle sensor 502 is configured to detect any obstacle that may be in the path of the first ground engaging tool 122a during use of the plough implement. It will be appreciated that similar obstacle sensors may also be provided in any of the embodiments shown in FIGS. 2 to 6. In the example FIG. 7, an exemplary obstacle 504 may be a rock covered in the soil under the ground surface 80. Once an obstacle 504 is detected by the obstacle sensor 502, a feedback signal is sent to a control unit 506, which may be connected to the hydraulic system 508 to activate the actuator 110.

In particular, if an obstacle 504 is detected in front of the first ground engaging tool 122a, the control unit 506 may send a signal to the hydraulic system 508 to extend actuator 110, thereby lifting the first ground engaging tool 122a out of the soil in the direction of arrow D to avoid a collision of the ground engaging tool 122a with obstacle 504. In this embodiment, the first ground engaging tool 122a will be pivoted up and away from the obstacle 504, when extending the actuator 110.

The obstacle sensor 502 is arranged in front of the first ground engaging tool in a working direction of the plough implement. One obstacle sensor 502 may be used to scan the entire width of the entire plough implement, such that control unit 506 may be able to actively raise each of the ground engaging tools that may be affected by a particular obstacle. To this end, control unit 506 may have a database including information about the position of each of the ground engaging tools with respect to the obstacle sensor 502.

The obstacle sensor 502 in the embodiment of FIG. 7 is a contactless sensor that may detect obstacles by way of radiation. Alternatively, it is of course possible to utilise contact sensors that penetrate into the soil and detect obstacles, such as stones, of a size that may cause damage to the ground engaging tools.

In another, non-represented variation of the stone-trip arrangement shown in FIG. 7, no obstacle detector may be required. Rather, obstacles may be detected upon impact of the ground engaging tools with the obstacles. Such impact will create a pressure increase within actuator 110 shown in FIG. 7 that may be measured within hydraulic system 508 and fed back to control unit 506. Control unit 506 may use this signal to either actively pull the ground engaging tools out of the ground via actuator 110 or reduce the flow resistance of hydraulic system 508 such that actuator 110 may retract more easily due to the reactive force created by the impact between the ground engaging tool and the obstacle.

In view of the above, the plough implement of the present disclosure may be able to decrease the working depth of the ground engaging tool of one or more ground engaging tools pro-actively or passively to avoid collision with obstacles or prevent damage during collision.

Figure 8:
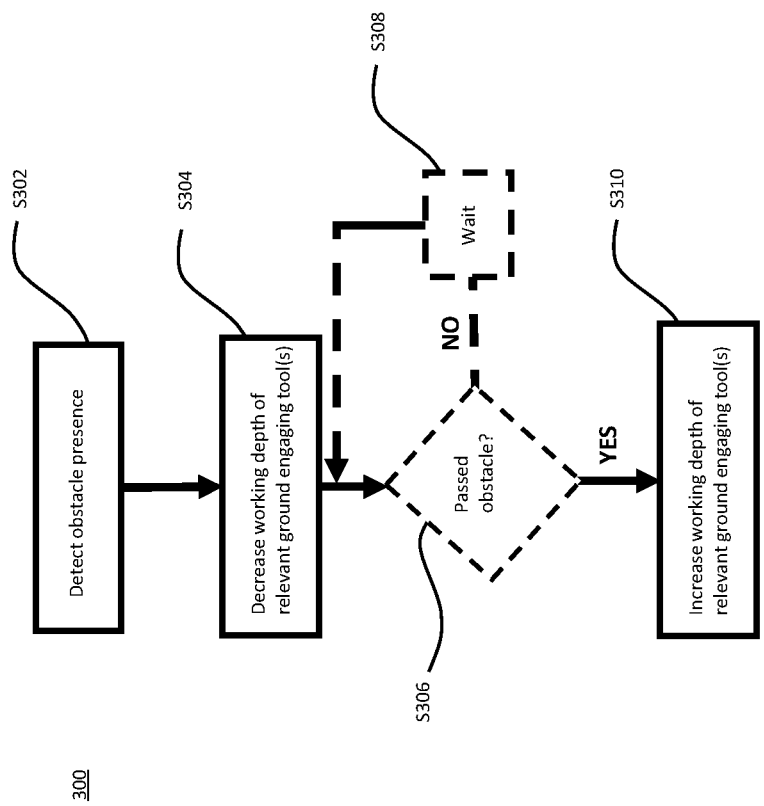
FIG. 8 shows a flow diagram for a method of adjusting the working depth of a plough implement.

A method 300 of adjusting the working depth in accordance with the stone-trip embodiment shown in FIG. 7 is described in FIG. 8. FIG. 8 shows a flow-chart of the method for predicting or reacting to obstacles such as stones. In a first step S302 the presence of an obstacle is detected. This step may include steps for locating obstacles within the soil and identifying whether said obstacle will be in the working path of any of the ground engaging tools of the plough implement. To this end, a control unit may have access to a database providing the control unit with information as to the position of each of the ground engaging tools with respect to a particular obstacle. Alternatively, detecting the obstacle may also be achieved by measuring the impact of corresponding ground engaging tools with an obstacle, in which case the control unit knows which of the ground engaging tools is affected. Once a position of the obstacle and the relevant ground engaging tools are determined, the working depth of the affected ground engaging tools is decreased in a second step S304. In other words, the ground engaging tools that are about to collide with an obstacle or have already collided with an obstacle may be pulled out of the soil to avoid damage/further damage to the ground engaging tools.

In an optional step S306, the obstacle sensor may be used to detect whether or not the obstacle has been passed. If the obstacle has not yet been passed, the sensor may wait for a predetermined amount of time until a further measurement is taken. If the obstacle has been passed, the working depth of the relevant ground engaging tools may yet again be increased to its level before the obstacle was detected, in a further step S310. It should be understood that, instead of steps S306 and S308, the control unit may be set up to wait for a predetermined amount of time before lowering the ground engaging tools (i.e. increasing the working depth) again. This predetermined amount of time may be based on previous experience of the operator or may be set after the size of the obstacle is detected by an obstacle sensor enabling the control unit to calculate a time required to pass said obstacle.

Although this detailed description referred to plough bodies and skimmers, it should be appreciated that the present disclosure is not limited to such ground engaging tools. Rather, any form of ground engaging tool of a plough implement may be used in connection with the depth adjustment apparatus described above. Similarly, the number and arrangement of the ground engaging tools shown in the Figures should not be understood to be limiting to the scope of this disclosure.

The listing or discussion of an apparently prior-published document in this specification should not necessarily be taken as an acknowledgement that the document is part of the state of the art or is common general knowledge.

Preferences and options for a given aspect, feature or parameter of the invention should, unless the context indicates otherwise, be regarded as having been disclosed in combination with any and all preferences and options for all other aspects, features and parameters of the disclosure.

The invention claimed is:

1. A plough implement comprising a main frame and a plurality of first ground engaging tools, wherein the plough implement is a reversible plough, the main frame supports the plurality of first ground engaging tools, and the plough implement comprises a depth adjustment apparatus configured to move at least a first ground engaging tool of the plurality of first ground engaging tools with respect to the main frame to enable adjustment of a working depth of the first ground engaging tool;
   wherein the depth adjustment apparatus comprises a four-link parallelogram linkage connecting the main frame to the first ground engaging tool, the four-link parallelogram linkage comprises a first pivotable link, a second pivotable link, and a coupler link, the first ground engaging tool is coupled to the coupler link, the first pivotable link is pivotally coupled to the main frame via a first pivot and to the coupler link via a second pivot, the second pivotable link is pivotally coupled to the main frame via a third pivot and to the coupler link via a fourth pivot, and the first pivot and the third pivot are offset from one another along a longitudinal axis of the main frame; and
   wherein a first length of the first pivotable link is equal to a second length of the second pivotable link, and a first distance between the first pivot and the third pivot is equal to a second distance between the second pivot and the fourth pivot to enable the depth adjustment apparatus to maintain an orientation of the first ground engaging tool with respect to a ground surface while moving the first ground engaging tool relative to the main frame.

2. The plough implement of claim 1, wherein the depth adjustment apparatus comprises an actuator configured to drive the depth adjustment apparatus.

3. The plough implement of claim 1, wherein the plough implement comprises a control unit for controlling the depth adjustment apparatus, and the control unit is configured to decrease the working depth of the first ground engaging tool of the plurality of first ground engaging tools if an obstacle collision is encountered and/or predicted.

4. The plough implement of claim 3, comprising an obstacle sensor configured to identify obstacles, the obstacle sensor being arranged in front of the first ground engaging tool in a direction of travel.

5. The plough implement of claim 1, wherein a second ground engaging tool of the plurality of first ground engaging tools is coupled to the coupler link, and the depth adjustment apparatus is configured to move the first and second ground engaging tools of the plurality of first ground engaging tools with respect to the main frame such that movement of the first and second ground engaging tools is synchronized.

6. The plough implement of claim 1, wherein the plough implement comprises a second depth adjustment apparatus configured to move a second ground engaging tool of the plurality of first ground engaging tools with respect to the main frame, and the first and second depth adjustment apparatus are configured to move the first and second ground engaging tools independently of each other.

7. The plough implement of claim 1, wherein the main frame supports a plurality of second ground engaging tools and is transferable between a first configuration, in which the plurality of first ground engaging tools is in a respective working position, and a second configuration, in which the plurality of second ground engaging tools is in a respective working position, and the plough implement comprises a second depth adjustment apparatus configured to move a first ground engaging tool of the plurality of second ground engaging tools with respect to the main frame to enable adjustment of a working depth of the first ground engaging tool of the plurality of second ground engaging tools.

8. The plough implement of claim 7, wherein the first ground engaging tool of the plurality of first ground engaging tools is moveable independently of the first ground engaging tool of the second plurality of ground engaging tools.

9. The plough implement of claim 1, wherein the depth adjustment mechanism is configured to move the first ground engaging tool between a first position, in which a minimum working depth is set, and a second position, in which a maximum working depth is set; and
   wherein the plough implement comprises a first stop configured to lock the first ground engaging tool in the first position, the plough implement comprises a second stop configured to lock the first ground engaging tool in the second position, or a combination thereof.

10. The plough implement of claim 1, wherein the first ground engaging tool is a plough body.

11. Agricultural machinery comprising an agricultural vehicle and the plough implement of claim 1, wherein the plough implement is connected to a front or a rear of the agricultural vehicle.

12. A plough implement comprising a main frame and a plurality of ground engaging tools, wherein the main frame supports the plurality of ground engaging tools, and the plough implement comprises a depth adjustment apparatus configured to move a first ground engaging tool of the plurality of ground engaging tools with respect to the main frame to enable adjustment of a working depth of the first ground engaging tool;
   wherein the depth adjustment apparatus comprises a pivotable link, a first actuator and a second actuator, the pivotable link is pivotally coupled to the main frame via a first pivot and to the first ground engaging tool via a second pivot, the first actuator is configured to drive the pivotable link to rotate to adjust the working depth of the first ground engaging tool, and the second actuator is configured to drive the first ground engaging tool to rotate relative to the pivotable link to adjust an orientation of the first ground engaging tool relative to a ground surface.

13. The plough implement of claim 12, wherein the plough implement comprises a control unit for controlling the depth adjustment apparatus, wherein the control unit is configured to automatically synchronize actuation of the first and second actuators to maintain the first ground engaging tool at a target orientation relative to the ground surface while the working depth is adjusted.

14. The plough implement of claim 12, wherein the first actuator is pivotally coupled to the main frame and to the pivotable link, and the second actuator is pivotally coupled to the pivotable link and to the first ground engaging tool.

15. The plough implement of claim 12, wherein the plough implement is a reversible plough.

16. The plough implement of claim 12, wherein the first ground engaging tool is a plough body.

\* \* \* \* \*